Figure 2:
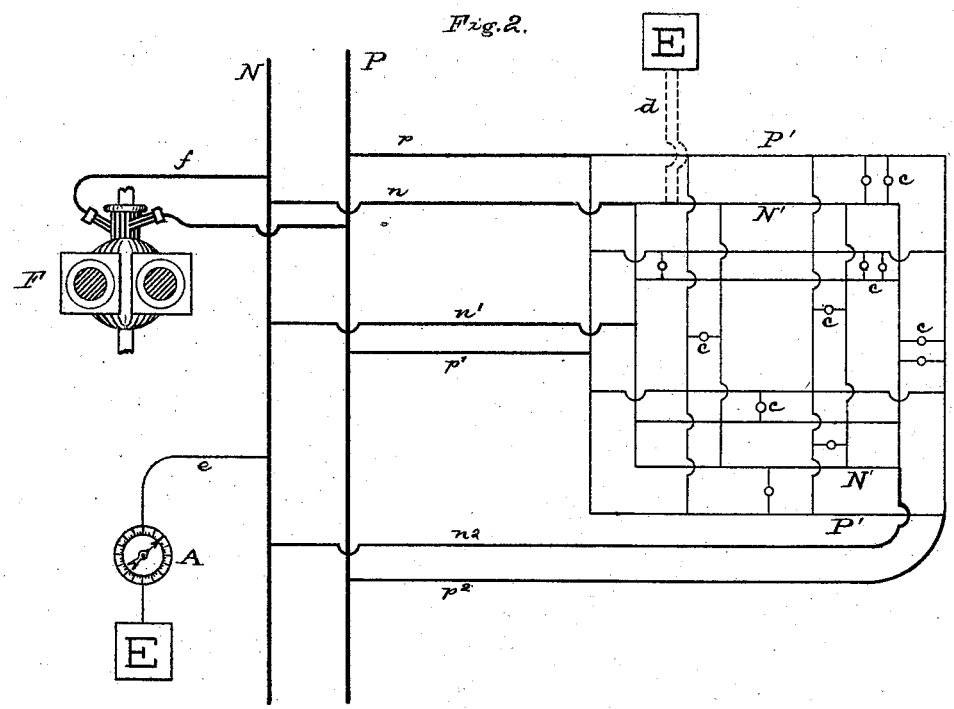

(No Model.)

C. S. BRADLEY.
METHOD OF ELECTRICAL TESTING.

No. 287,501. Patented Oct. 30, 1883.

ATTEST:
E. C. Rowlands
H. W. Seely

INVENTOR:
Charles S. Bradley
By Rich'd N. Dyer,
Atty.

UNITED STATES PATENT OFFICE.

CHARLES S. BRADLEY, OF NEW YORK, N. Y., ASSIGNOR TO THE EDISON ELECTRIC LIGHT COMPANY, OF SAME PLACE.

METHOD OF ELECTRICAL TESTING.

SPECIFICATION forming part of Letters Patent No. 287,501, dated October 30, 1883.

Application filed February 17, 1883. (No model.)

*To all whom it may concern:*

Be it known that I, CHARLES S. BRADLEY, of the city, county, and State of New York, have invented a new and useful Improvement in Methods of Electrical Testing, of which the following is a specification.

My invention relates to methods of discovering the presence and location of leaks or ground-connections caused by defects in the insulation of electrical conductors, and especially of the conductors employed in multiple-arc systems of electrical distribution, my objects being, first, to discover the resistance of the insulation between each conductor of a circuit and the ground, hence determining whether any defects or leaks occur in such insulation, and in which conductor such leaks occur; and, second, to determine the location in the system of such leaks, if any are found to be present, both of these operations being performed without withdrawing the current from the system to any material extent.

I accomplish the first object by so connecting the conductors and the earth that the insulation lying between them and the earth forms two of the sides of a Wheatstone bridge. This may be done by connecting both conductors to one terminal of a galvanometer, or to any suitable device for indicating electric currents through resistances, one of which should be adjustable, the other terminal of the indicating device being connected to the earth. If one insulation is of less resistance than the other, the bridge will be thrown out of balance and the indicating device will show the passage of current. The adjustable resistance is then changed until said indicating device is not affected, and by the amount of adjustment the ratio of resistance of the two insulations may be determined; but to determine the positive value of such resistances, either conductor is connected to the earth through a known resistance, a shunt being thus formed around the unknown resistance of the insulation of said conductor. I then again vary the adjustable resistance until the indicating device is not affected, by which I determine the effect of the known resistance of the shunt, and by noting the difference between this and the effect of the unknown resistance of the insulation the latter is readily determined. As I know also the ratio of the resistances of this and the other insulation, I can also easily calculate the latter. If, in applying these tests to the main circuit of an electrical-distribution system, it is found that the resistance of the insulation of either side of the circuit is unusually low, it will be known that a defect is somewhere present in such insulation, causing a ground-connection or leak.

As stated, the second object of my invention is to discover the location in the system of such a leak. To accomplish this I connect the galvanometer or other instrument for indicating electric current at the central station to the pole of the circuit in which such leak occurs, thus forming a shunt around that portion of the conductor which lies between the galvanometer and the leak. The direction of deflection of the galvanometer-needle will determine the direction in which the leak lies, and the amount of such deflection will indicate the distance of such leak, as the amount of current in the circuit depends upon the electrical distance from the source of supply. It is also necessary to determine in or near which feeding-circuit leading from the central station to the intersecting consumption-circuits the leak occurs. This may be done by adding a number of electric lamps or other translating devices to the system, successively, at points near the terminals of the different feeding-circuits, thus causing increase of current in each of such circuits, one after another. When the circuit nearest the leak is reached, the effect of the increase will be perceptible in the increased deflection of the galvanometer. The same result may be accomplished by successively increasing the resistance of the feeding-circuits, for when the circuit nearest the leak is reached the deflection of the galvanometer will be more than with the other circuits; or the successive disconnection and reconnection of the feeding-circuits produces a like effect.

By successively employing the different parts of my invention I am enabled to determine the location of a leak with great precision, first determining in which conductor the leak exists and the extent of such leak, then defining the direction and distance of the leak, and finally discovering its location with reference to the feeding-circuits of the system.

My invention is illustrated diagrammatically in the annexed drawings, in which—

Figure 1:
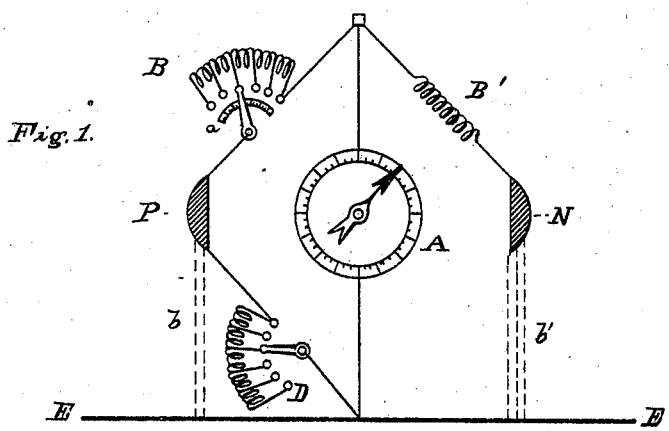

Figure 1 is a diagram showing the manner of measuring the insulation of conductors; and Fig. 2, a diagram of an electric-lighting system, illustrating the method of determining the location of leaks or ground-connections.

Referring to Fig. 1, P N represent electrical conductors, preferably the main conductors at the central station of an electrical-distribution system, or points in electrical connection with such main conductors. Conductor P is connected to one terminal of a galvanometer, A, through a resistance, B, which is adjustable by means of pivoted arm $a$. Conductor N is connected to the same terminal through constant resistance B'. The other terminal of the galvanometer is connected to earth E, as shown. The dotted lines $b\ b'$ indicate the connection between the conductors and the earth throughout the system through the insulation which surrounds said conductors. If the resistances of the two insulations are equal, the galvanometer-needle will remain stationary; but should they be unequal, current will pass through the galvanometer and deflect its needle. By adjusting the resistance B until the galvanometer is again balanced, the difference of resistance between the two insulations is indicated by the amount of such adjustment, and any improper ground-connection or leak in either conductor will be apparent. During these operations the circuit through the known resistance D between conductor P and the earth is open. By closing this I form a shunt around the insulation of conductor P and again deflect the galvanometer-needle. I again adjust the resistance B, and by noting the difference between this and the former adjustment the relation between the resistances D and $b$ will be known, and from this the positive value of the resistances of $b$ and $b'$ are readily determined. Having thus discovered the extent of the leak and the side of the circuit in which it occurs, I connect the galvanometer to this side of the circuit, which may be the negative side N, as indicated in Fig. 2. In this figure F represents a generator or battery of generators feeding into the main conductors P N. From these main conductors feeding-circuits $p\ n$, $p'\ n'$, and $p^2\ n^2$ run to the system of intersecting and connected positive conductors P' and negative conductors N', on which lamps and other translating devices, $c\ c$, are arranged in multiple arc. The dotted lines $d$ indicate a leak between a conductor, N', and the earth. It is evident that when the galvanometer A is connected to main conductor N by wire $e$, a shunt, $d\ E\ e$, is formed through said galvanometer, through which current will pass, and the distance of the leak will be determined by the amount of deflection, the extent of the leak being already known. If the leak were at a point between the galvanometer and the generator—for instance, at $f$—this would be shown by the direction of deflection. It now only remains to determine in what particular part of the system the leak occurs. To do this I may either increase or decrease the resistance of the feeders one after another, as explained, or successively disconnect such feeders, and by noting the effect on the galvanometer-needle determine which feeder approaches nearest to the point of leakage.

While I have described my invention with reference to systems of electrical distribution, it is evident that it may readily be applied to any round metallic circuits to measure the insulation of the conductors of such circuits and to determine the location of any defects which may exist in such insulation. It is also evident that the connections necessary for accomplishing my invention may be made and the tests applied not only at the central station, but at any part of the system.

What I claim is—

1. The method of ascertaining the location of ground-connections in a round metallic circuit, consisting in first measuring the resistance of the insulation on each side of the circuit to determine on which side a leak occurs and the extent of such leak, and then connecting an electrical indicating device between the side which contains the leak and the earth, the direction and amount of the current passing through said device determining the direction and distance of the leak, substantially as set forth.

2. The method of ascertaining the relative resistances of the respective insulations of the two conductors of a round metallic circuit, consisting in connecting both conductors to the earth, one through a constant resistance and an electrical indicating device, the other through an adjustable resistance and the same indicating device, and adjusting said adjustable resistance until such indicating device is not affected, the amount of such adjustment indicating the difference between the resistances of the two insulations, substantially as set forth.

3. The method of electrical testing for assisting in determining the resistance of the insulation of each side of a round metallic circuit, consisting in connecting both conductors to the earth, one through a constant resistance and an electrical indicating device, the other through an adjustable resistance and the same indicating device, and adjusting said adjustable resistance until said indicating device is not affected, thus determining the ratio of the two resistances, then connecting one conductor to the ground through a known resistance, and again adjusting said adjustable resistance, whereby the ratio between such known resistance and the resistance of said last-mentioned insulation is determined, substantially as set forth.

4. The method of ascertaining the location of a leak or ground-connection in a multiple-arc system of electrical distribution employing feeding-circuits, consisting in first comparing the resistances of the insulations of the two sides of the system to determine on which side the leak occurs, connecting an electrical indicating device between the side containing the leak and the earth to determine the distance and direction of such leak and then varying or removing the current in the feeding-circuits, successively, to determine which feeding circuit approaches nearest to the leak, substantially as set forth.

This specification signed and witnessed this 2d day of February, 1883.

CHARLES S. BRADLEY.

Witnesses:
  H. W. SEELY,
  EDWARD H. PYATT.